United States Patent [19]

Kizawa

[11] 3,769,063
[45] Oct. 30, 1973

[54] PROCESS FOR APPLYING EMULSION COATING MATERIAL TO PRODUCE CRAKLE PATTERNS

[75] Inventor: Kango Kizawa, Amagasaki, Japan

[73] Assignee: Meiken Kagakukogyo Kabushiki Kaisha, Akashi-shi, Hyogo-ken, Japan

[22] Filed: May 12, 1971

[21] Appl. No.: 142,764

[30] Foreign Application Priority Data
Feb. 10, 1971 Japan.................................. 46/5733

[52] U.S. Cl.......................... 117/41, 117/72, 117/73
[51] Int. Cl............................................. B44d 1/44
[58] Field of Search........................... 117/41, 73, 72

[56] References Cited
UNITED STATES PATENTS

| 2,612,456 | 9/1952 | Thacker et al. | 117/41 |
|---|---|---|---|
| 3,382,089 | 5/1968 | Klein et al. | 117/41 |
| 3,284,233 | 11/1966 | Sexsmith | 117/166 X |
| 2,962,382 | 11/1960 | Ives | 117/166 X |
| 2,866,720 | 12/1958 | Martin | 117/41 X |
| 2,714,560 | 8/1955 | Hookway | 117/41 |
| 3,635,858 | 1/1972 | Shiratori | 117/41 |
| 2,467,228 | 4/1949 | Pritzker | 117/41 |
| 2,350,818 | 6/1944 | Rees | 117/41 |
| 2,021,152 | 11/1935 | Neuhaus | 117/41 |
| 1,879,314 | 9/1932 | Kiss | 117/41 |

Primary Examiner—William D. Martin
Assistant Examiner—Bernard D. Pianalto
Attorney—Wenderoth, Lind & Ponack

[57] ABSTRACT

A process for applying emulsion coating material to produce crackle patterns which comprises applying an aqueous emulsion undercoating material having as base material a synthetic resin emulsion containing at least one selected from the group consisting of a water-soluble high molecular weight organic substance and an inorganic substance having high swelling property in excess of the quantity required as emulsion stabilizing agent or dispersant, drying the thus applied emulsion undercoating material, and applying an aqueous emulsion set coating material containing as base material at least one selected from the group consisting of homo- and co-polymer emulsions of acrylic ester, homo- and co-polymer emulsions of methacrylic ester, said emulsion containing silicon dioxide sol.

2 Claims, No Drawings

PROCESS FOR APPLYING EMULSION COATING MATERIAL TO PRODUCE CRAKLE PATTERNS

The present invention relates to a process for applying emulsion coating material to produce crackle patterns, characterized by that, after an aqueous emulsion under-coating material having as base material a synthetic resin emulsion containing a water-soluble high molecular weight organic substance of an inorganic substance having high swelling property, such as polyvinyl alcohol, bentonite, or both of them in excess of the quantity required as emulsion stabilizing agent or dispersant has been applied and dried, an aqueous emulsion set coating material containing as base material a homo- or co-polymer emulsion of acrylic ester or methacrylic ester or a mixture of them which are mixed with silicon dioxide sol in the amount more than 3 percent as solid matter is applied.

The conventional coating material producing crackle patterns which has been used heretofore was a lacquer type coating material containing nitrocellulose as base material and added with a large quantity of pigment and a swelling agent such as aluminum stearate, or a type of coating material, containing as base material a drying oil such as tung oil, added thereto with an excess of dryer and would be dried at a high temperature. However, these coatings include, because of the solvent contained therein, a number of problems in the aspects of toxicity, inflammability, odor and price, and in particular, such coating material as the oil type coating material that must be dried at a high temperature, can not be used for buildings. Other processes that have been proposed include those in which a strongly water-repelling material is applied on an undercoating material and on the dried surface a set coating material is applied, or an undercoating material mixed with a strongly water-repelling material is applied and dried and then on the surface of the same a set coating material is applied, but they are far from being practical because they can be applied on a horizontal surface but not on a vertical surface.

The object of the present invention is to provide a method enabling to easily produce crackle patterns on the coated film, thereby eliminating the disadvantages of the conventional coating materials mentioned above for producing crackle patterns, by the use of an aqueous synthetic resin coating material having special constitution.

The undercoating material according to the present invention is produced by mixing the synthetic resin emulsion with a water-soluble high molecular weight organic substance and/or an inorganic substance having a high swelling property with water in remarkably larger quantity than that required as an emulsion stabilizing agent or dispersant.

Water-soluble high molecular weight organic substances having high swelling property include partially saponified polyvinvy alcohol, polyethylene oxide, methylcellulose, and hydroxyethylcellulose and inorganic substances for the purpose include bentonite.

When the set coating is applied after the coated film of the above-mentioned undercoat has been dried, the water-soluble high molecular weight organic substance or the inorganic substance having a highly swelling property existing mingled with in the film of undercoating swells by absorption of the water contained in the set coating material, the set coating material simultaneously causing the contraction thereof, and thus conjointly with each other forming the condition where crackles necessarily are produced so that the object of the present invention is achieved.

The set coating material used in this invention contains homo- or co-polymer emulsion of acrylic or methacrylic ester or a mixure thereof as base material and silicon dioxide sol (usually called silica sol) in such an amount that the solid content of the sol exceeds 3 percent of the total composition of the set coating material. The commercially available silica sol, usually containing about 20 percent of solid silicon dioxide and water as dispersion medium, is very bulky but reduces the volume when dried into a gel. A film of such set coating material as above seriously contracts as it is dried and crackles are likely to occur. The suitable silicon dioxide content was more than 5 percent of the total composition of the set coating material. If less than 3 percent, the material contracted too little to produce crackle patterns.

When the set coating material having high rate of volume contraction while being dried is applied on a dried film of the emulsion undercoating material which contains, as described above, water-soluble high molecular organic substances or inorganic substances as bentonite that swell appreciably with water or both of the substances, the undercoating material swells by absorbing water in the set coating material, and thereby the condition is provided under which crackles are necessarily produced in the set coating material having large volume contraction owing to the quicker drying than in the natural condition, so that the object of this invention is attained. This point constitutes the fundamental conception of the present invention.

It is well known that the silica sol is added in a quantity less than 20 percent of that of synthetic rubber latex or synthetic resin emulsion so as to improve the waterproof property and to reduce the stickiness. But the primary object of the addition in this invention is that the considerable contraction of the silica sol as it is dried causes crackle formation. Therefore, the quantity of silica sol ($SiO_2$ content being 20 percent) added to the synthetic resin emulsion (content of resin being 50 percent) amounts to as much as more than 100 percent. In this regard, the method according to the present invention represents a method developed irrelevantly to the facts already well known.

As a vehicle for the set coating material of this invention there is employed the aqueous emulsion of homo- or copolymers of acrylic or methacrylic ester or a mixture thereof, but the composition of vehicle should be selected according to where and in what season it is used. The above composition of emulsion is necessary, since the emulsion is very miscible with silica sol compared with emulsion of the other resins and stable enough to prevent causing partial coagulation nor gelation, so that, after the set coating material is applied, the crackle patterns formed have confirmed advantages of not forming drips nor flows. As vehicle for the undercoating emulsion, water-insoluble synthetic resin emulsion capable of forming coating film of any kind may be used for the purpose of this invention, so long as it is provided with the performance to be used as coating material.

The emulsion coating material producing crackle patterns according to the present invention, can be applied by means of any of the commonly used coating method, such as, brushing, applying by roller, spraying and the like. The dimension and the figure of the crackle patterns can be controlled by varying the thickness of applied material and the utensils to be used.

In the process of this invention to produce crackle patterns, the set coating material is resistant against water and humidity since it contains acrylic synthetic resin as vehicle. On the contrary, however, since the cracked portion of the surface is composed of an undercoating material containing a large proportion of water swelling substance, it may be expected that the undercoating material may swell in a high humidity circumstance or by water and, as a result, the property of the whole coating film may be deteriorated and the abrasion resistant property is lessened. Therefore, when the coating is applied to wall or flooring of kitchen or bathroom where the coating material is required to have high resistance against humidity and abrasion, it is desired to apply a solution of polyurethane, epoxy or acrylic resin on the crackle pattern film.

Examples of the form embodying the present invention will now be explained. All "part" in the following examples imply part by weight.

EXAMPLE 1

A. Emulsion coating material for undercoating:
Polyvinyl acetate emulsion (resin content 50 percent) 50 parts
Polyvinyl alcohol (saponification degree 85 percent, 10 percent solution) 120 parts
Titanium dioxide dispersed in water (solid content 50 percent) 20 parts
Black pigment of iron oxide dispersed in water (solid content 50 percent) 2 parts By effecting high speed agitation of the above constituents in a vessel for agitating emulsion, a deep gray emulsion coating material for undercoating was obtained.

B. Emulsion coating material for set coating:
Copolymer emulsion of ehtyl acrylate and methyl methacrylate (resin content 50 percent) 80 parts
Silica sol ($SiO_2$ content 20 percent) 120 parts
Hydroxyethyl cellulose (3 percent aqueous solution) 140 parts
Ethyleneglycol 5 parts
Titanium dioxide dispersed in water (solid content 50 percent) 50 parts
Brown pigment of iron oxide dispersed in water (solid content 50 percent) 3 parts By effecting high speed agitation of the above constituents in a vessel, a light brown colored emulsion for set coating material was obtained.

C. When, after the emulsion coating material for under-coating mentioned above had been applied and dried, said emulsion coating material for set coating was applied onto said dried coating film in a slightly greater thickness of coating compared with that in the case of ordinary coating, complex crackles in relatively thin lines were produced as the film of set coating material was dried, and vein-like deep gray patterns of the undercoating appeared, intersecting the brown color of the setting coat in the cracked portions.

Example 2

A. Undercoating emulsion material:
Vinyl acetate-acrylic ester copolymer emulsion (resin content 50 percent) 50 parts
Polyethylene oxide (high degree of polymerization, 3 percent aqueous solution) 50 parts
Bentonite wet swelled with water (solid content 20 percent) 70 parts
Titanium dioxide dispersed in water (solid content 50 percent) 20 parts
Chromic oxide pigment dispersed in water (solid content 50 percent) 3 parts Above constituents were agitated in a high speed in a vessel and green undercoating emulsion material was obtained.

B. Set coating emulsion material:
Methyl acrylate polymer emulsion (resin content 50 percent) 30 parts
Ethyl methacrylate polymer emulsion (resin content 50 percent) 50 parts
Silica sol ($SiO_2$ content 20 percent) 130 parts
Ethyleneglycolmonobutyl ether 5 parts
Brown pigment of iron oxide dispersed in water (solid content 50 percent) 3 parts
Titanium dioxide dispersed in water (solid content 50 percent) 50 parts The above constituents were agitated in a high speed in a vessel and light brown set coating emulsion material was obtained.

C. The above undercoating emulsion material was applied by spraying on the surface of a motor wall and, on the dried coating film of the said material, the above set coating emulsion material was applied twice by spraying. As a result, crackle patterns in relatively thick irregular lines or veins colored in green by the undercoating material were produced on the light brown coating film as it was dried.

What is claimed is:

1. A process for producing crackle patterns which comprises:
   A. preparing an aqueous synthetic resin emulsion comprising 50 parts of 50 percent polyvinyl acetate resin emulsion and 120 parts of a 10 percent solution of polyvinyl alcohol of 85 percent saponification degree;
   B. coating aqueous emulsion of A on a substrate and drying said emulsion;
   C. preparing an aqueous emulsion comprising 50 parts of a 50 percent ethyl acrylate-methyl acrylate copolymer emulsion and 120 parts of a silica sol containing about 20 percent by weight silicon dioxide, the silica content of emulsion of C being at least 3 percent by total weight thereof when set;
   D. coating the aqueous emulsion of C on said coated substrate of B; and
   E. drying the coated substrate of D to produce a crackle pattern.

2. A process for producing crackle patterns which comprises:
   A. preparing an aqueous emulsion comprising 50 parts of a 50 percent vinyl acetate-acrylic ester copolymer emulsion, 120 parts of a 3 percent solution of polyethylene oxide and 70 parts of bentonite swelled with water at 20 percent solid content;
   B. coating aqueous emulsion of A on a substrate and drying said emulsion;
   C. preparing an aqueous emulsion comprising 50 parts of a 50 percent methyl acrylate polymer emulsion, 50 parts of a 50 percent ethyl methacrylate polymer emulsion and 130 parts of a silica sol containing about 20 percent by weight silicon dioxide, the silica content of emulsion C being at least 3 percent by total weight thereof when set;

D. coating the aqueous emulsion of C on said coated substrate of B;

and

E. drying the coated substrate of D to produce a crackle pattern.

* * * * *